(12) United States Patent
Cao et al.

(10) Patent No.: US 9,053,217 B2
(45) Date of Patent: Jun. 9, 2015

(54) RATIO-ADJUSTABLE SYNC MARK DETECTION SYSTEM

(71) Applicant: LSI Corporation, San Jose, CA (US)

(72) Inventors: Rui Cao, Milpitas, CA (US); Yu Kou, San Jose, CA (US); Shaohua Yang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 201 days.

(21) Appl. No.: 13/777,937

(22) Filed: Feb. 26, 2013

(65) Prior Publication Data

US 2014/0237329 A1    Aug. 21, 2014

Related U.S. Application Data (60) Provisional application No. 61/765,786, filed on Feb. 17, 2013.

(51) Int. Cl.
| | |
|---|---|
| *G11B 5/09* | (2006.01) |
| *G06F 11/34* | (2006.01) |
| *G11B 27/00* | (2006.01) |
| *H04L 1/00* | (2006.01) |

(52) U.S. Cl.
CPC ............... *G06F 11/34* (2013.01); *G11B 27/00* (2013.01); *H04L 1/00* (2013.01)

(58) Field of Classification Search
CPC ............ G11B 20/1403; G11B 20/10009; G11B 5/09; G11B 20/10527; G11B 2220/90; G11B 27/3027; G11B 20/1426

USPC ................ 360/40, 32, 39, 51, 48, 29, 31, 65, 360/77.02; 369/59.22
See application file for complete search history.

(56) References Cited

U.S. PATENT DOCUMENTS

| | | |
|---|---|---|
| 4,777,544 A | 10/1988 | Brown et al. |
| 5,130,866 A | 7/1992 | Klaassen et al. |
| 5,237,325 A | 8/1993 | Klein et al. |
| 5,278,703 A | 1/1994 | Rub et al. |
| 5,309,357 A | 5/1994 | Stark et al. |
| 5,341,249 A | 8/1994 | Abbott et al. |
| 5,377,058 A | 12/1994 | Good et al. |
| 5,521,948 A | 5/1996 | Takeuchi |
| 5,523,902 A | 6/1996 | Pederson |
| 5,594,341 A | 1/1997 | Majidi-Ahy |
| 5,668,679 A | 9/1997 | Swearingen et al. |
| 5,696,639 A | 12/1997 | Spurbeck et al. |
| 5,768,044 A | 6/1998 | Hetzler |
| 5,781,129 A | 7/1998 | Schwartz et al. |
| 5,798,885 A | 8/1998 | Saiki et al. |
| 5,835,295 A | 11/1998 | Behrens |

(Continued)

FOREIGN PATENT DOCUMENTS

| | | |
|---|---|---|
| FR | 2904168 A1 | 1/2008 |
| WO | WO 03/047091 | 6/2003 |
| WO | WO 2008/009620 | 1/2008 |

OTHER PUBLICATIONS

U.S. Appl. No. 13/529,572, filed Jun. 21, 2012, Yang et al.

(Continued)

*Primary Examiner* — Nabil Hindi
(74) *Attorney, Agent, or Firm* — Hamilton DeSanctis & Cha (57) ABSTRACT

Systems, methods, devices, circuits for data processing, and more particularly to systems and methods for detecting a sync mark with a ratio-adjustable detection system.

20 Claims, 6 Drawing Sheets

(56) References Cited

U.S. PATENT DOCUMENTS

| | | | |
|---|---|---|---|
| 5,844,920 A | 12/1998 | Zook et al. |
| 5,852,524 A | 12/1998 | Glover et al. |
| 5,892,632 A | 4/1999 | Behrens |
| 5,955,783 A | 9/1999 | Ben-Efraim |
| 5,970,104 A | 10/1999 | Zhong et al. |
| 5,986,830 A | 11/1999 | Hein |
| 5,987,562 A | 11/1999 | Glover |
| 6,009,549 A | 12/1999 | Bliss et al. |
| 6,023,383 A | 2/2000 | Glover et al. |
| 6,069,583 A | 5/2000 | Silvestrin et al. |
| 6,081,397 A | 6/2000 | Belser |
| 6,111,712 A | 8/2000 | Vishakhadatta et al. |
| 6,208,478 B1 | 3/2001 | Chiu et al. |
| 6,269,058 B1 | 7/2001 | Yamanoi et al. |
| 6,278,591 B1 | 8/2001 | Chang |
| 6,400,518 B1 | 6/2002 | Bhaumik et al. |
| 6,404,829 B1 | 6/2002 | Sonu |
| 6,411,452 B1 | 6/2002 | Cloke |
| 6,430,356 B1 * | 8/2002 | Hara et al. | 386/279 |
| 6,441,661 B1 | 8/2002 | Aoki et al. |
| 6,476,989 B1 | 11/2002 | Chainer |
| 6,490,110 B2 | 12/2002 | Reed et al. |
| 6,493,162 B1 | 12/2002 | Fredrickson |
| 6,519,102 B1 | 2/2003 | Smith et al. |
| 6,530,060 B1 | 3/2003 | Vis et al. |
| 6,603,622 B1 | 8/2003 | Christiansen et al. |
| 6,606,048 B1 | 8/2003 | Sutardja |
| 6,633,447 B2 | 10/2003 | Franck et al. |
| 6,646,822 B1 | 11/2003 | Tuttle et al. |
| 6,657,802 B1 | 12/2003 | Ashley et al. |
| 6,671,404 B1 | 12/2003 | Kawatani |
| 6,717,764 B2 | 4/2004 | Lake |
| 6,775,529 B1 | 8/2004 | Roo |
| 6,788,484 B2 | 9/2004 | Honma |
| 6,813,108 B2 | 11/2004 | Annampedu et al. |
| 6,816,328 B2 | 11/2004 | Rae |
| 6,839,014 B2 | 1/2005 | Uda |
| 6,856,183 B2 | 2/2005 | Annampedu |
| 6,865,040 B2 | 3/2005 | Fayeulle et al. |
| 6,876,511 B2 | 4/2005 | Koyanagi |
| 6,906,990 B2 | 6/2005 | Nagata et al. |
| 6,912,099 B2 | 6/2005 | Annampedu et al. |
| 6,963,521 B2 | 11/2005 | Hayashi |
| 6,980,382 B2 | 12/2005 | Hirano et al. |
| 6,999,257 B2 | 2/2006 | Takeo |
| 6,999,264 B2 | 2/2006 | Ehrlich |
| 6,999,404 B2 | 2/2006 | Furumiya et al. |
| 7,002,767 B2 | 2/2006 | Annampedu et al. |
| 7,016,131 B2 | 3/2006 | Liu et al. |
| 7,038,875 B2 | 5/2006 | Lou et al. |
| 7,054,088 B2 | 5/2006 | Yamazaki et al. |
| 7,072,137 B2 | 7/2006 | Chiba |
| 7,082,005 B2 | 7/2006 | Annampedu et al. |
| 7,092,462 B2 | 8/2006 | Annampedu et al. |
| 7,116,504 B1 | 10/2006 | Oberg |
| 7,126,776 B1 | 10/2006 | Warren, Jr. et al. |
| 7,133,227 B2 | 11/2006 | Chiang |
| 7,136,250 B1 | 11/2006 | Wu et al. |
| 7,154,689 B1 | 12/2006 | Shepherd et al. |
| 7,158,464 B2 | 1/2007 | Gushima et al. |
| 7,167,328 B2 | 1/2007 | Annampedu et al. |
| 7,180,693 B2 | 2/2007 | Annampedu et al. |
| 7,187,739 B2 | 3/2007 | Ma |
| 7,191,382 B2 | 3/2007 | James et al. |
| 7,193,544 B1 | 3/2007 | Fitelson et al. |
| 7,193,798 B2 | 3/2007 | Byrd et al. |
| 7,199,961 B1 | 4/2007 | Wu et al. |
| 7,203,013 B1 | 4/2007 | Han et al. |
| 7,203,015 B2 | 4/2007 | Sakai et al. |
| 7,206,146 B2 | 4/2007 | Flynn et al. |
| 7,230,789 B1 | 6/2007 | Brunnett et al. |
| 7,248,425 B2 | 7/2007 | Byun et al. |
| 7,253,984 B1 | 8/2007 | Patapoutian et al. |
| 7,265,937 B1 | 9/2007 | Erden et al. |
| 7,286,313 B2 | 10/2007 | Erden et al. |
| 7,301,717 B1 | 11/2007 | Lee et al. |
| 7,308,057 B1 | 12/2007 | Patapoutian |
| 7,323,916 B1 | 1/2008 | Sidiropoulos et al. |
| 7,362,536 B1 | 4/2008 | Liu et al. |
| 7,375,918 B1 | 5/2008 | Shepherd et al. |
| 7,394,608 B2 | 7/2008 | Eleftheriou |
| 7,411,531 B2 | 8/2008 | Aziz et al. |
| 7,420,498 B2 | 9/2008 | Barrenscheen |
| 7,423,827 B2 | 9/2008 | Neville |
| 7,446,690 B2 | 11/2008 | Kao |
| 7,525,460 B1 | 4/2009 | Liu et al. |
| 7,529,320 B2 | 5/2009 | Byrne et al. |
| 7,558,177 B2 | 7/2009 | Ogura et al. |
| 7,602,567 B2 | 10/2009 | Park |
| 7,602,568 B1 | 10/2009 | Katchmart |
| 7,616,395 B2 | 11/2009 | Yamamoto |
| 7,620,101 B1 | 11/2009 | Jenkins |
| 7,630,155 B2 | 12/2009 | Maruyama et al. |
| 7,643,235 B2 | 1/2010 | Erden et al. |
| 7,656,982 B2 | 2/2010 | Gaedke |
| 7,663,831 B2 | 2/2010 | Hayashi et al. |
| 7,679,850 B2 | 3/2010 | Smith |
| 7,693,243 B2 | 4/2010 | Chen et al. |
| 7,738,200 B2 | 6/2010 | Annampedu |
| 7,768,437 B2 | 8/2010 | Annampedu |
| 7,768,730 B2 | 8/2010 | Bliss et al. |
| 7,796,480 B2 | 9/2010 | Cheng et al. |
| 7,813,065 B2 | 10/2010 | Annampedu |
| 7,821,730 B2 | 10/2010 | Cao |
| 7,835,104 B2 | 11/2010 | Yamashita |
| 7,889,823 B2 | 2/2011 | Yang |
| 7,929,237 B2 | 4/2011 | Grundvig |
| 7,929,238 B1 | 4/2011 | Vasquez |
| 7,974,034 B1 * | 7/2011 | Han et al. | 360/51 |
| 8,014,099 B2 | 9/2011 | Mathew |
| 8,054,573 B2 | 11/2011 | Mathew |
| 8,054,931 B2 | 11/2011 | Annampedu |
| 8,059,349 B2 | 11/2011 | Annampedu |
| 8,098,451 B2 | 1/2012 | Graef |
| 8,098,557 B2 * | 1/2012 | Miyashita et al. | 369/59.22 |
| 8,102,960 B2 | 1/2012 | Ran et al. |
| 8,107,573 B2 | 1/2012 | Chang |
| 8,154,818 B2 | 4/2012 | Mathew |
| 8,154,972 B2 | 4/2012 | Ratnakar Aravind |
| 8,169,726 B2 | 5/2012 | Wilson |
| 8,174,784 B2 | 5/2012 | Grundvig |
| 8,174,949 B2 | 5/2012 | Ratnakar Aravind |
| 8,237,597 B2 | 8/2012 | Liu |
| 8,243,381 B2 | 8/2012 | Annampedu |
| 8,254,049 B2 | 8/2012 | Annampedu |
| 8,261,171 B2 | 9/2012 | Annampedu |
| 8,587,888 B2 * | 11/2013 | Haratsch et al. | 360/51 |
| 8,810,943 B2 * | 8/2014 | Yang et al. | 360/51 |
| 2002/0150179 A1 | 10/2002 | Leis et al. |
| 2005/0243455 A1 | 11/2005 | Annampedu |
| 2007/0104300 A1 | 5/2007 | Esumi et al. |
| 2008/0056403 A1 | 3/2008 | Wilson |
| 2009/0142620 A1 | 6/2009 | Yamamoto et al. |
| 2009/0274247 A1 | 11/2009 | Galbraith et al. |
| 2010/0061490 A1 | 3/2010 | Noeldner |
| 2010/0067628 A1 | 3/2010 | Buehner |
| 2010/0142078 A1 | 6/2010 | Annampedu |
| 2011/0043938 A1 | 2/2011 | Mathew |
| 2011/0157737 A1 | 6/2011 | Grundvig et al. |
| 2011/0209026 A1 | 8/2011 | Xia |
| 2012/0036173 A1 | 2/2012 | Annampedu |
| 2012/0084336 A1 | 4/2012 | Yang et al. |
| 2012/0087035 A1 | 4/2012 | Graef |
| 2012/0106607 A1 | 5/2012 | Miladinovic et al. |
| 2012/0120784 A1 | 5/2012 | Yang et al. |
| 2012/0124241 A1 | 5/2012 | Yang et al. |
| 2012/0134042 A1 | 5/2012 | Annampedu |

(56) References Cited

U.S. PATENT DOCUMENTS

| 2012/0134043 A1 | 5/2012 | Annampedu |
| 2012/0155587 A1 | 6/2012 | Annampedu |
| 2012/0182643 A1 | 7/2012 | Zhang |
| 2012/0236428 A1 | 9/2012 | Xia |

OTHER PUBLICATIONS

Annampedu, V. et al "Adaptive Algorithms for Asynchronous Detection of Coded Servo Signals Based on Interpolation", IEEE Transactions on Magnetics, vol. 41, No. 10, Oct. 2005.

Aziz et al., "Asynchronous Maximum Likelihood (ML) Detection of Servo Repeatable Run Out (RRO) Data", Digest, IEEE Intl Mag Conf, vol. 42, No. 10, pp. 2585-2587 (Oct. 2006).

Aziz et al., "Interpolation Based Maximum-Likelihood(ML) Detection of Asynchronous Servo Repeatable Run Out (RRO) Data" IEEE Intl Mag Conf. vol. 42 No. 10 pp. 2585-2587, Oct. 2006.

Hagenauer et al., "A Viterbi algorithm with soft-decision outputs and its applications," in Proc. IEEE Global Telecom Conf 1989, Dallas, Texas, pp. 1680-1686 (Nov. 1989).

Kryder, M. et al "Heat Assisted Magnetic Recording" Proc. IEEE, vol. 96, No. 11, p. 1810, Nov. 2008.

Polikar, Robi "Ensemble Based Systems in Decision Making" IEEE Circuits and Systems Magazine Third qtr 2006, p. 21-47.

U.S. Appl. No. 13/773,886, Unpublished (filed Feb. 22, 2013) (Dahua Qin).

U.S. Appl. No. 13/491,135, Unpublished (filed Jun. 7, 2012) (Xun Zhang).

U.S. Appl. No. 13/490,913, Unpublished (filed Jun. 7, 2012) (Xun Zhang).

U.S. Appl. No. 13/242,983, Unpublished (filed Sep. 23, 2011) (Jeffrey P. Grundvig).

U.S. Appl. No. 13/186,267, Unpublished (filed Jul. 19, 2011) (Haitao Xia).

U.S. Appl. No. 13/173,088, Unpublished (filed Jun. 30, 2011) (Jeffrey P. Grundvig).

U.S. Appl. No. 13/096,873, Unpublished (filed Apr. 28, 2011) (Ross S. Wilson).

U.S. Appl. No. 13/100,021, Unpublished (filed May 3, 2011) (Haitao Xia).

Weller et al "Thermal Limits in Ultrahigh-density Magnetic Recording" IEEE Trans. Magn. vol. 35, No. 6, p. 4423, Nov. 1999.

* cited by examiner

RATIO-ADJUSTABLE SYNC MARK DETECTION SYSTEM

CROSS REFERENCE TO RELATED APPLICATIONS

The present application claims priority to (is a non-provisional of) U.S. Pat. App. No. 61/765,786, entitled "Ratio-Adjustable Sync Mark Detection System", and filed Feb. 17, 2013 by Cao et al, the entirety of which is incorporated herein by reference for all purposes.

FIELD OF THE INVENTION

Various embodiments of the present invention provide systems and methods for data processing, and more particularly to systems and methods for detecting a sync mark with a ratio-adjustable detection system.

BACKGROUND

Various circuits have been developed that provide for identifying synchronization marks within a data stream. Synchronization marks enable particular locations in the data stream to be identified using data patterns that can be searched for. However, because data can become partially corrupted during storage or transmission, the ideal data pattern may not appear in the data stream that is retrieved or received.

SUMMARY

Various embodiments of the present invention provide systems and methods for data processing, and more particularly to systems and methods for detecting a sync mark with a ratio-adjustable detection system.

A data processing circuit is disclosed including a pattern match calculation circuit and an indication circuit. The pattern match calculation circuit is operable to calculate a number of metrics representing a difference between a data sequence and each of a number of possible data patterns. One of the possible data patterns is a target data pattern and the other possible data patterns each include a subset of the target data pattern. A primary metric calculated metrics corresponds to the difference between the data sequence and the target data pattern. The indication circuit is operable to compare the primary metric with each of the other metrics. At least one of the metrics is scaled, thereby balancing the likelihood of early detection and misdetection. The indication circuit is operable to assert a target data pattern found signal based at least in part on the comparisons.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

FIG. 2b graphically shows comparisons yielding the various outputs of a sync mark pattern match calculation circuit included in the ratio-adjustable sync mark detector circuit of FIG. 2a;

DETAILED DESCRIPTION OF THE INVENTION

The present inventions are related to systems and methods for data processing, and more particularly to systems and methods for detecting patterns in a data stream, such as but not limited to detecting a sync mark with a ratio-adjustable detection system.

Figure 1:
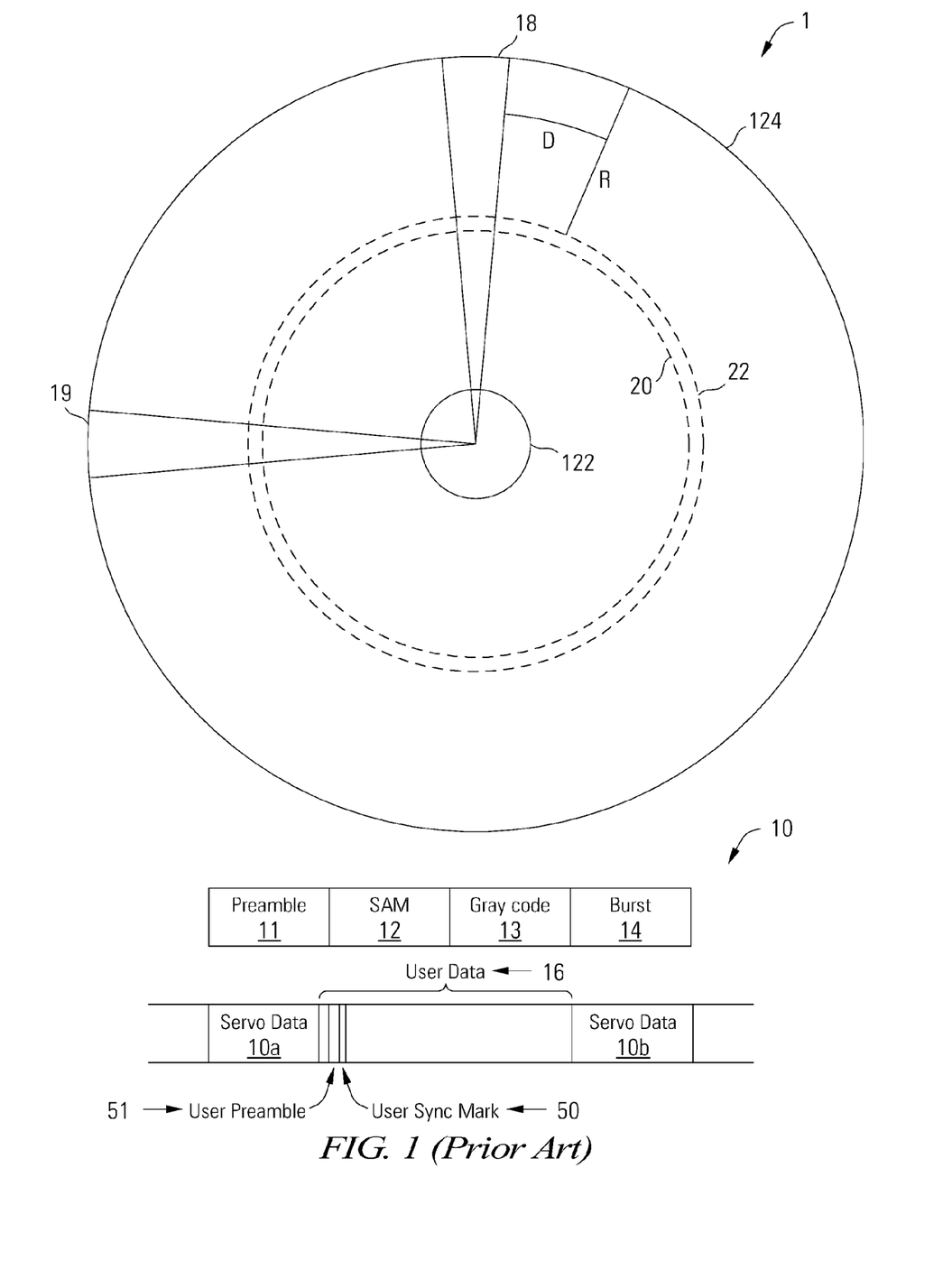
FIG. 1 is a block diagram of a known magnetic storage medium and sector data scheme.

Turning to FIG. 1, a storage medium 1 is shown with two exemplary tracks 20, 22 indicated as dashed lines. The tracks are segregated by servo data written within wedges 19, 18. These wedges include servo data 10 that are used for control and synchronization of a read/write head assembly over a desired location on storage medium 1. In particular, the servo data generally includes a preamble pattern 11 followed by a servo address mark 12 (SAM). Servo address mark 12 is followed by a Gray code 13, and Gray code 13 is followed by burst information 14. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14.

Between the servo data bit patterns 10a and 10b, a user data region 16 is provided. User data region 16 may include one or more sets of data that are stored to storage medium 1. The data sets may include user synchronization information some of which may be used as a mark to establish a point of reference from which processing of the data within user data region 16 may begin processing.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. In a write operation, the sensor would sense servo data from wedge 19 then write data to the user data region between wedge 19 and wedge 18. Then, the sensor would be switched to sense a remaining portion of the user data region followed by the servo data from wedge 18. Once the user data region is reached, a user sync mark 50 is detected and used as a reference point from which data processing is performed in order to achieve frame synchronization. User sync mark 50 is preceded by a user preamble 51.

As used herein, the phrase "sync mark" is used in its broadest sense to mean any pattern that may be used to establish a point of reference. Thus, for example, a sync mark may be user sync mark 50 as is known in the art, or one or more portions of servo data bit patterns 10. Based upon the disclosure provided herein, one of ordinary skill in the art may recognize other sync marks that could be used in relation to different embodiments of the present invention.

Figure 2A:
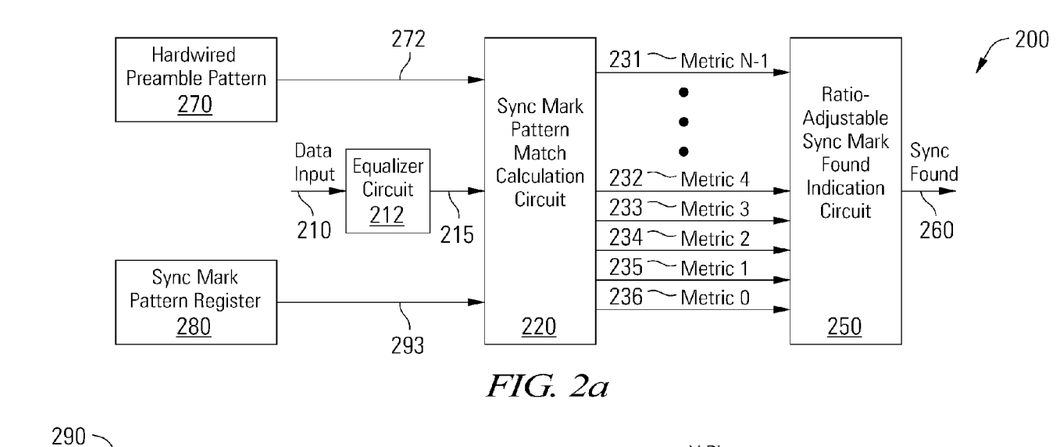
FIG. 2a depicts a ratio-adjustable sync mark detector circuit in accordance with one or more embodiments of the present invention.

Turning to FIG. 2a, a ratio-adjustable sync mark detector circuit 200 is shown in accordance with one or more embodiments of the present invention. Sync mark detector circuit 200 includes an equalizer circuit 212 that receives a data input 210 and provides an equalized output 215. In some embodiments, equalizer circuit 212 is a digital finite impulse response filter as are known in the art. Data input 210 may be a series of digital samples. The digital samples may represent, for example, data stored on a storage medium or data received via a wireless communication medium. Based upon the disclosure provided herein, one of ordinary skill in the art will recognize a variety of sources of data input 210, including but not limited to an analog to digital converter sampling a sensed analog signal to yield a series of digital samples.

Equalizer output 215 is provided to a sync mark pattern match calculation circuit 220. In some embodiments, digital samples from an analog to digital converter are provided directly to the sync mark pattern match calculation circuit 220 without passing through an equalizer circuit 212. Sync mark pattern match calculation circuit 220 compares equalizer output 215 (or digital samples from an analog to digital converter) with a preamble pattern 272 from a hardwired preamble pattern 270 and to a sync mark pattern 293 from a sync mark pattern register 280. Sync mark pattern register 280 may either be hard coded, or reprogrammable depending upon the particular implementation. In some embodiments of the present invention, the sync mark stored in sync mark pattern register 280 is a defined pattern of twenty bits in length. In contrast, hardwired preamble pattern 270 includes a repeating portion of a preamble pattern. In some embodiments of the present invention, the preamble that precedes the sync mark pattern repeats every two cycles. As such, the preamble pattern includes twenty or more bits of the preamble repeating as follows: '11001100110011001100'. In such a case, preamble pattern 272 is '1100'.

The comparison done by sync mark pattern match calculation circuit 220 yields a number of values corresponding to a difference between equalizer output 215 and various components of preamble pattern 272 and sync mark pattern 293. In some particular embodiments of the present invention, the comparison is an absolute sum distance between equalizer output 215 and the particular pattern to which it is being compared in accordance with the following equation:

$$\text{metric } D_n = \sum_{i=0}^{L_{sm}-1} |x[i] - \hat{x}_n[i]|, n \in [0, N-1],$$

where $D_n$ is a distance metric, $L_{sm}$ is the length of the sync mark length, x is the input sequence from equalizer circuit 212 or an analog to digital converter (not shown), $\hat{x}_n$ is the $n^{th}$ ideal input sequence or comparison pattern, N is the number of possible ideal sync mark patterns, and i represents an individual sample value. In some other particular embodiments of the present invention, the comparison is a Euclidean distance between equalizer output 215 and the particular pattern to which it is being compared in accordance with the following equation:

$$\text{metric } D_n = \sum_{i=0}^{L_{sm}-1} |x[i] - \hat{x}_n[i]|^2, n \in [0, N-1],$$

although the use of Euclidean distances requires ($L_{sm}+4$) square operations in addition to the operations performed when calculating the absolute sum distance.

In particular, sync mark pattern match calculation circuit 220 provides a metric N−1 output 231 that corresponds to a comparison between the bits of sync mark pattern 293 and the same number of bits of equalizer output 215. Sync mark pattern match calculation circuit 220 also provides: a metric 4 output 232 that corresponds to a comparison between the bits of sync mark pattern 293 less the most recent Y bits of sync mark pattern 293, and the same number of bits of equalizer output 215; a metric 3 output 233 that corresponds to a comparison between the bits of sync mark pattern 293 less the most recent 2Y bits of sync mark pattern 293, and the same number of bits of equalizer output 215; a metric 2 output 234 that corresponds to a comparison between the bits of sync mark pattern 293 less the most recent 3Y bits of sync mark pattern 293, and the same number of bits of equalizer output 215; a metric 1 output 235 that corresponds to a comparison between the bits of sync mark pattern 293 less the most recent 4Y bits of sync mark pattern 293, and the same number of bits of equalizer output 215; a metric 0 output 236 that corresponds to a comparison between the bits of sync mark pattern 293 less the most recent 5Y bits of sync mark pattern 293, and the same number of bits of equalizer output 215. In one particular embodiment of the present invention, sync mark pattern 293 is twenty bits in length, and the value of Y is four bits. Based upon the disclosure provided herein, one of ordinary skill in the art will recognize a variety of lengths of sync bit patterns and corresponding values of Y that may be used in relation to different embodiments of the present invention. The sync mark pattern match calculation circuit is not limited to any particular number N of metric outputs.

Figure 2B:
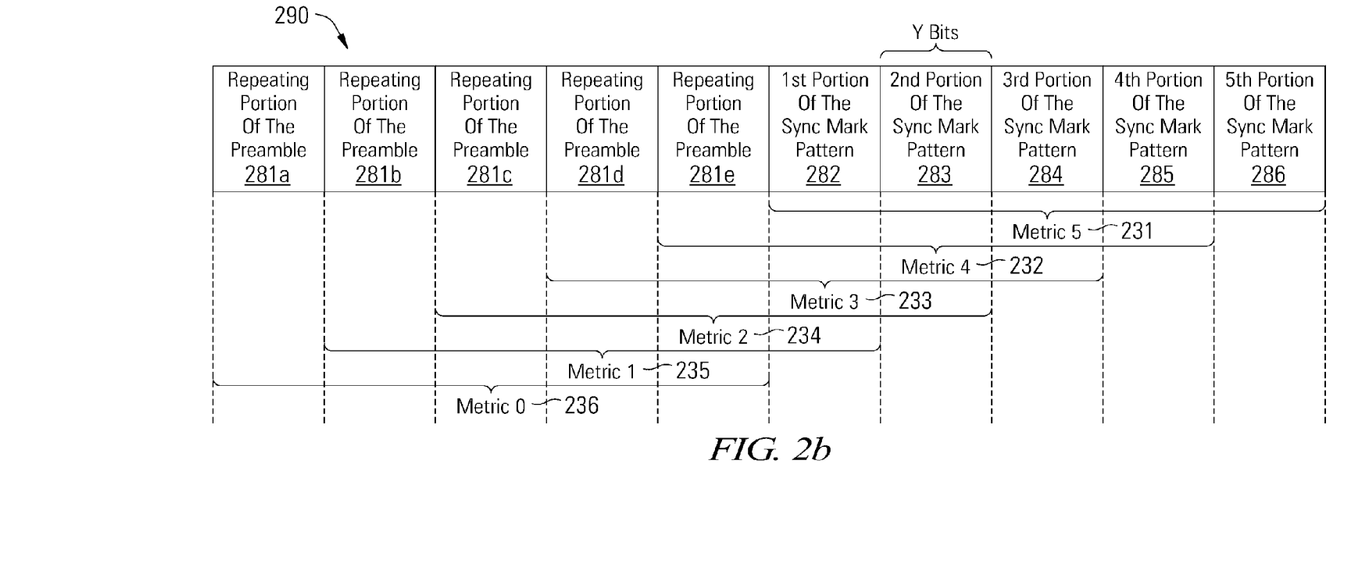

FIG. 2b graphically shows comparisons yielding the various outputs of a sync mark pattern match calculation circuit 220 that were described above. In particular, a time line 290 shows Y-bit preamble pattern 272 repeated a number of times (i.e., elements 281a, 281b, 281c, 281d, 281e) and a number of different Y-bit portions (i.e., elements 282, 283, 284, 285, 286) of sync mark pattern 293 lined up in time as they would be expected to be received as part of an incoming data stream.

As shown, sync match output 231 corresponds to a comparison (e.g., a distance measurement) between equalizer output 215 and the five consecutive Y-bit portions 282, 283, 284, 285, 286 of sync mark pattern 293. Metric 4 output 232 corresponds to a comparison (e.g., a distance) between equalizer output 215 and one Y-bit portion of the preamble 281e appended with the four least recent Y-bit portions 282, 283, 284, 285 of sync mark pattern 293. Metric 3 output 233 corresponds to a comparison (e.g., a distance) between equalizer output 215 and two Y-bit portions of the preamble 281d, 281e appended with the three least recent Y-bit portions 282, 283, 284 of sync mark pattern 293. Metric 2 output 234 corresponds to a comparison (e.g., a distance) between equalizer output 215 and three Y-bit portions of the preamble 281c, 281d, 281e appended with the two least recent Y-bit portions 282, 283 of sync mark pattern 293. Metric 1 output 235 corresponds to a comparison (e.g., a distance) between equalizer output 215 and four Y-bit portions of the preamble 281b, 281c, 281d, 281e appended with the least recent Y-bit portion 282 of sync mark pattern 293. Metric 0 output 236 corresponds to a comparison (e.g., a distance) between equalizer output 215 and five Y-bit portions of the preamble 281a, 281b, 281c, 281d, 281e. The sequences from time line 290 that are compared with equalizer output 215 to generate the metric outputs 231, 232, 233, 234, 235 and 236 are also referred to herein as possible sync mark patterns or possible data patterns, and the sync mark pattern 293 is also referred to herein as the target data pattern. The metric 231 corresponding to the sync mark pattern 293 is also referred to herein as the primary metric. The possible sync mark patterns may be considered to be the contents of a sliding window as it moves across the data stream from the storage medium, with the contents of the sliding window being a possible sync mark pattern as long as it includes at least some of a sync mark written to the storage medium. The possible sync mark patterns are known in advance in some embodiments.

Sync Mark Pattern Match Calculation Circuit 220 may be any circuit that is capable of producing distance metrics (e.g., metric N−1 output 231, metric 4 output 232, metric 3 output 233, metric 2 output 234, metric 1 output 235 and metric 0 output 236) as disclosed herein. Based upon the disclosure provided herein, one of ordinary skill in the art will recognize a variety of circuits that may be used in relation to different embodiments of the present invention. For example, the Sync Mark Pattern Match Calculation Circuit 220 may be implemented as disclosed in US Patent Application Publication 2012-0124241 entitled "Systems and Methods for Sync Mark Detection", filed by Yang et al. on May 17, 2012, the entirety of which is incorporated herein by reference for all purposes.

Metric N−1 output 231, metric 4 output 232, metric 3 output 233, metric 2 output 234, metric 1 output 235 and metric 0 output 236 are provided to a ratio-adjustable sync mark found indication circuit 250. Sync mark found indication circuit 250 combines the received inputs to determine whether a sync mark was found. When a sync mark is found, a sync found output 260 is asserted.

In one particular embodiment of the present invention where the comparisons performed to determine metric N−1 output 231, metric 4 output 232, metric 3 output 233, metric 2 output 234, metric 1 output 235 and metric 0 output 236 are calculations of the absolute sum distance or Euclidean distance from a defined pattern to an input data set, the values of the aforementioned inputs are each lower when the respective patterns are closer to matching. In such a case, sync found output 260 is asserted whenever the value provided as Metric N−1 231 is less than any of the values provided as metric 4 output 232, metric 3 output 233, metric 2 output 234, metric 1 output 235 and metric 0 output 236. Before comparing metric N−1 output 231 with metric 4 output 232, metric 3 output 233, metric 2 output 234, metric 1 output 235 and metric 0 output 236, an adjustable ratio or scaling factor is imposed on the metrics to balance the two types of sync mark detection failures, early detection and misdetection. In some particular embodiments, a ratio is applied to metric 4 output 232, metric 3 output 233, metric 2 output 234, metric 1 output 235 and metric 0 output 236. In other particular embodiments, a different ratio is applied to some or all of metric 4 output 232, metric 3 output 233, metric 2 output 234, metric 1 output 235 and metric 0 output 236. In yet other particular embodiments, a ratio is applied to metric 0 output 236. The following pseudocode represents the logic implemented in such an embodiment of sync mark found indication circuit 250:

```
If (Metric N-1 Output 231 < ratio * metric 4 output 232 &&
    Metric N-1 Output 231 < ratio * metric 3 output 233 &&
    Metric N-1 Output 231 < ratio * metric 2 output 234 &&
    Metric N-1 Output 231 < ratio * metric 1 output 235 &&
    Metric N-1 Output 231 < ratio * metric 0 output 236)
{
    Sync Found Output 260 = asserted
}
Else
{
    Sync Found Output 260 = de-asserted
}
```

The logic implemented in some embodiments of the sync mark found indication circuit 250 may be set forth in the following equations:

$$D_{N-1} < \gamma D i, i=0,1,2,3,\ldots,N-2, \gamma \in [0,1],$$

where γ is an adjustable ratio or scaling factor applied to each of metric 4 output 232, metric 3 output 233, metric 2 output 234, metric 1 output 235 and metric 0 output 236, or each metric but the primary metric N−1 231 corresponding with the sync mark pattern 293 only. In other embodiments, the logic is set forth in the following equation:

$$D_{N-1} < \gamma_i D i, i=0,1,2,3,\ldots,N-2, \gamma \in [0,1],$$

where $\gamma_i$ is a set of adjustable ratios or scaling factors applied to each of metric 4 output 232, metric 3 output 233, metric 2 output 234, metric 1 output 235 and metric 0 output 236, or each metric but the primary metric N−1 231 corresponding with the sync mark pattern 293 only, and where $\gamma_i$ includes at least two different ratios. In yet other embodiments, the logic is set forth in the following equation:

$$\gamma D_{N-1} < D i, i=0,1,2,3,\ldots,N-2, \gamma \in [1,\infty],$$

where γ is an adjustable ratio or scaling factor applied to the primary metric N−1 231 corresponding with the sync mark pattern 293 only.

Figure 3:
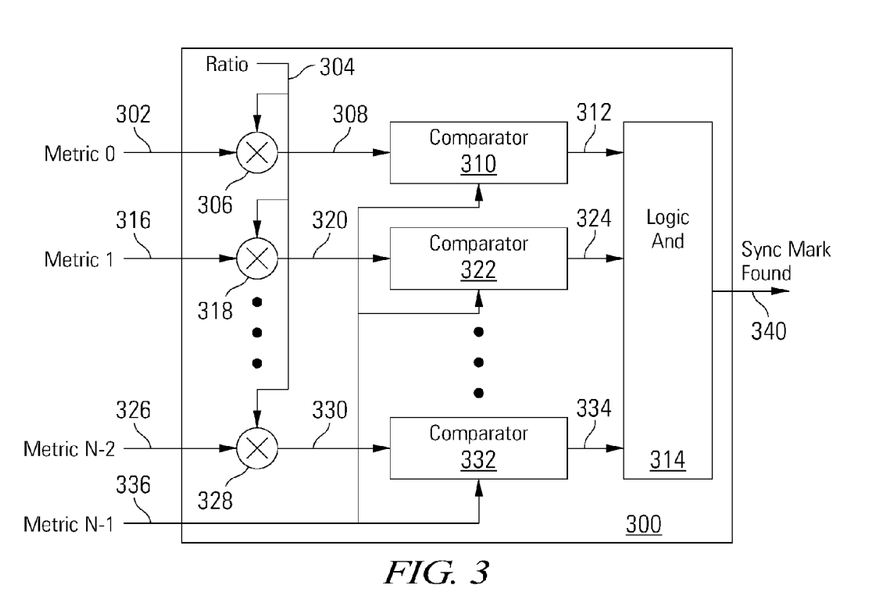
FIG. 3 depicts a ratio-adjustable sync mark found indication circuit with a common scaling ratio in accordance with one or more embodiments of the present invention.

Turning to FIG. 3, a ratio-adjustable sync mark found indication circuit 300 with a common scaling ratio is disclosed in accordance with one or more embodiments of the present invention. The sync mark found indication circuit 300 can be used in place of ratio-adjustable sync mark detector circuit 200 of FIG. 2a above. The sync mark found indication circuit 300 accepts as input the metrics representing the distances between an input data sequence and the possible sync mark patterns as shown on timeline 290 of FIG. 2b. The example embodiment of FIG. 3 receives N metrics, including metric 0 302, metric 1 316, metric N−2 326 and metric N−1 336. Metric N−1 336 represents the distance between the input data sequence and the actual sync mark pattern 293, consisting of portions 282, 283,284,285,286 as shown in FIG. 2b, also referred to herein as the last possible sync mark pattern. In this embodiment, each of the metrics other than metric N−1 336, including metric 0 302, metric 1 316, metric N−2 326, are scaled by an adjustable ratio 304 in multipliers 306, 318, 328, yielding scaled metric 0 308, scaled metric 1 320, and scaled metric N−2 330 etc. The ratio 304 is adjusted in some embodiments during the design process and hardwired or hardcoded in the design of sync mark found indication circuit 300. In other embodiments the ratio 304 is adjusted using a ratio register (not shown) in sync mark found indication circuit 300, enabling a user to program the ratio value.

A comparator 310 compares the scaled metric 0 308 with metric N−1 336, asserting output 312 if metric N−1 336 is less than scaled metric 0 308 and de-asserting output 312 if metric N−1 336 is greater than scaled metric 0 308. A comparator 322 compares the scaled metric 1 320 with metric N−1 336, asserting output 324 if metric N−1 336 is less than scaled metric 1 320 and de-asserting output 324 if metric N−1 336 is greater than scaled metric 1 320. A comparator 332 compares the scaled metric N−2 330 with metric N−1 336, asserting output 334 if metric N−1 336 is less than scaled metric N−2 330 and de-asserting output 312 if metric N−1 336 is greater than scaled metric N−2 330.

A Logic And circuit 314 asserts the Sync Mark Found output 340 when all of outputs 312, 324, 334 are asserted and de-asserts the Sync Mark Found output 340 when any or all of outputs 312, 324, 334 are de-asserted. The multipliers 306, 318, 328, the comparators 310, 322, 332 and the Logic And circuit 314 thus implements the following pseudocode:

```
If (metric N-1 336 < ratio 304 * metric 0 302 &&
    metric N-1 336 < ratio 304 * metric 1 316 &&
    metric N-1 336 < ratio 304 * metric N-2 326 )
{
    Sync Mark Found output 340 = asserted
}
Else
{
    Sync Mark Found output 340 = de-asserted
}
``` and the following equation:

$$D_{N-1} < \gamma D_i, i=0,1,2,3,\ldots,N-2, \gamma \in [0,1],$$

where $D_{N-1}$ is metric N−1 336, $\gamma$ is ratio 304, and Di, i=0, 1, 2, 3, ..., N−2 are metric 0 302, metric 1 316 and metric N−2 326 (as well as any additional metrics between metric 1 316 and metric N−2 326).

Figure 4:
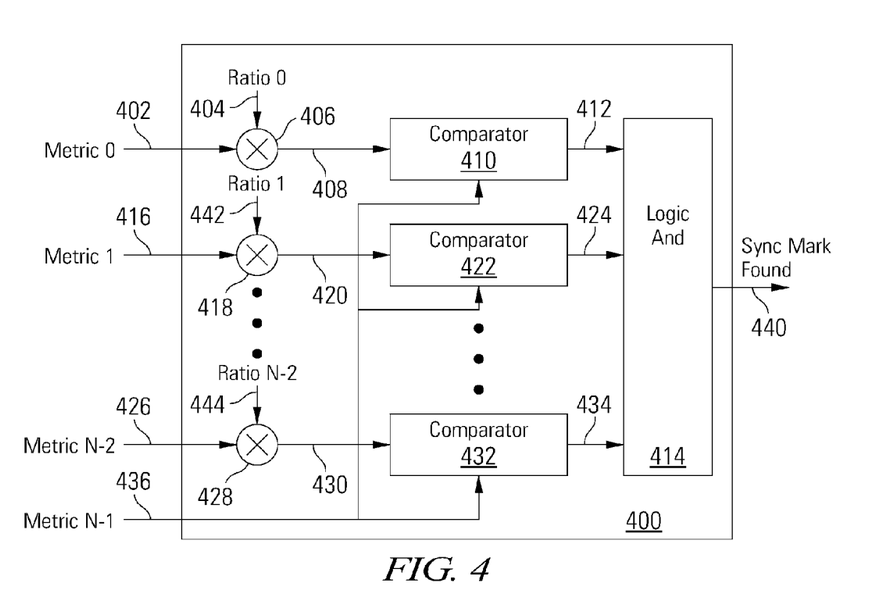
FIG. 4 depicts a ratio-adjustable sync mark found indication circuit with multiple scaling ratios in accordance with one or more embodiments of the present invention.

Turning to FIG. 4, another embodiment of a ratio-adjustable sync mark found indication circuit 400 with a common scaling ratio is disclosed in accordance with one or more embodiments of the present invention, in this embodiment having different ratios for different metrics to further improve the sync mark detection performance. The sync mark found indication circuit 400 can be used in place of ratio-adjustable sync mark detector circuit 200 of FIG. 2a above. The sync mark found indication circuit 400 accepts as input the metrics representing the distances between an input data sequence and the possible sync mark patterns as shown on timeline 290 of FIG. 2b. The example embodiment of FIG. 4 receives N metrics, including metric 0 402, metric 1 416, metric N−2 426 and metric N−1 436. Metric N−1 436 represents the distance between the input data sequence and the actual sync mark pattern 293, consisting of portions 282, 283,284,285,286 as shown in FIG. 2b, also referred to herein as the last possible sync mark pattern. In this embodiment, each of the metrics other than metric N−1 436, including metric 0 402, metric 1 416, metric N−2 426, are scaled by adjustable ratios 404, 442, and 444 in multipliers 406, 418, 428, yielding scaled metric 0 408, scaled metric 1 420, and scaled metric N−2 430 etc. Some or all of the ratios 404, 442 and 444 can be given different values in the range from 0 to 1. The ratios 404, 442 and 444 are adjusted in some embodiments during the design process and hardwired or hardcoded in the design of sync mark found indication circuit 400. In other embodiments the ratios 404, 442 and 444 are adjusted using ratio registers (not shown) in sync mark found indication circuit 400, enabling a user to program the ratio values.

A comparator 410 compares the scaled metric 0 408 with metric N−1 436, asserting output 412 if metric N−1 436 is less than scaled metric 0 408 and de-asserting output 412 if metric N−1 436 is greater than scaled metric 0 408. A comparator 422 compares the scaled metric 1 420 with metric N−1 436, asserting output 424 if metric N−1 436 is less than scaled metric 1 420 and de-asserting output 424 if metric N−1 436 is greater than scaled metric 1 420. A comparator 432 compares the scaled metric N−2 430 with metric N−1 436, asserting output 434 if metric N−1 436 is less than scaled metric N−2 430 and de-asserting output 412 if metric N−1 436 is greater than scaled metric N−2 430.

A Logic And circuit 414 asserts the Sync Mark Found output 440 when all of outputs 412, 424, 434 are asserted and de-asserts the Sync Mark Found output 440 when any or all of outputs 412, 424, 434 are de-asserted. The multipliers 406, 418, 428, the comparators 410, 422, 432 and the Logic And circuit 414 thus implements the following pseudocode:

```
If (metric N-1 436 < ratio 404 * metric 0 402 &&
    metric N-1 436 < ratio 442 * metric 1 416 &&
    metric N-1 436 < ratio 444 * metric N-2 426 )
{
    Sync Mark Found output 440 = asserted
}
Else
{
    Sync Mark Found output 440 = de-asserted
}
``` and the following equation:

$$D_{N-1} < \gamma_i D_i, i=0,1,2,3,\ldots,N-2, \gamma \in [0,1],$$

where $D_{N-1}$ is metric N−1 436, $\gamma_i$ are ratios 404, 442, 444, and Di, i=0, 1, 2, 3, ..., N−2 are metric 0 402, metric 1 416 and metric N−2 426 (as well as any additional metrics between metric 1 416 and metric N−2 426).

The ratio (e.g., 304) or ratios (e.g., 404, 442, 444) are adjusted to balance the likelihood of sync mark detection failures, early detection errors and misdetection errors, in order to provide the desired sync mark detection performance. Early detection errors are when the sync mark found location is either fully or partially in the preamble area, before the actual sync mark, corresponding for example when the input data sequence being processed contains one or more repeating portions 281a, 281b, 281c, 281d, 281e (FIG. 2b) of preamble pattern 272 (FIG. 2a). Misdetection errors happen when the sync mark pattern is not detected in the input data sequence. The use of metrics based on distance measurements between input data sequences and possible sync mark patterns, and comparisons between metrics, enable sync mark patterns to be detected without the use of fixed thresholds even when some data bits in the input data sequence have been corrupted or changed during storage or transmission. The use of adjustable ratios enables the performance to be tuned, balancing between the likelihood of early detection errors and misdetection errors. If the sync mark found indication circuit 250 is tuned too far toward preventing early detection errors, making the test to identify a sync mark more stringent, misdetection errors are more likely and an actual sync mark may be missed. If the sync mark found indication circuit 250 is tuned too far toward preventing misdetection errors, making the test to identify a sync mark more relaxed, early detection errors are more likely and the sync mark may be identified as found before the input data sequence has fully reached the actual sync mark.

Figure 5A:
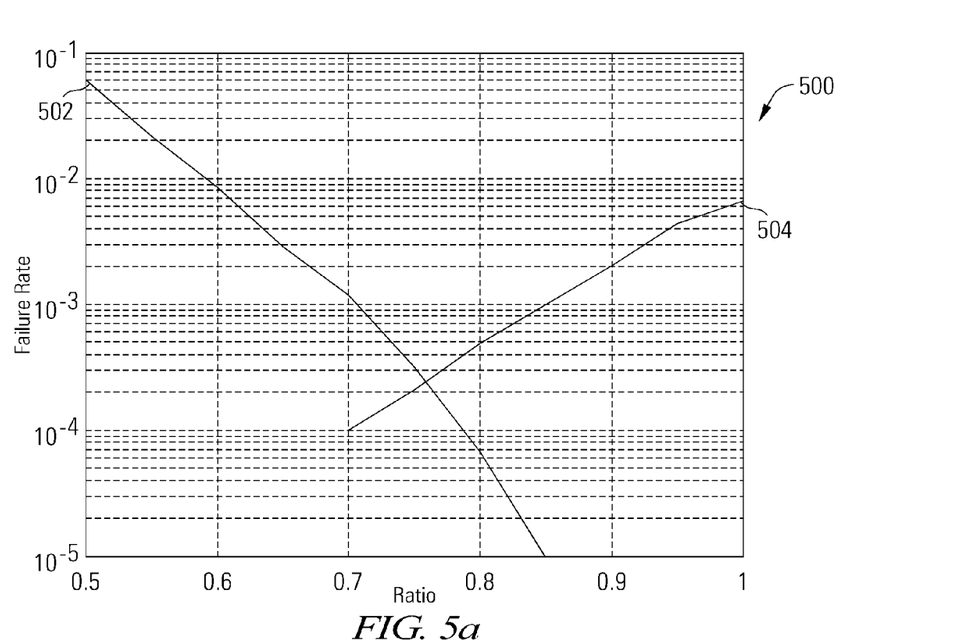
FIG. 5a graphically depicts early detection and misdetection failure rates as a function of the scaling ratio in a ratio-adjustable sync mark detector circuit in accordance with one or more embodiments of the present invention.
Figure 5B:
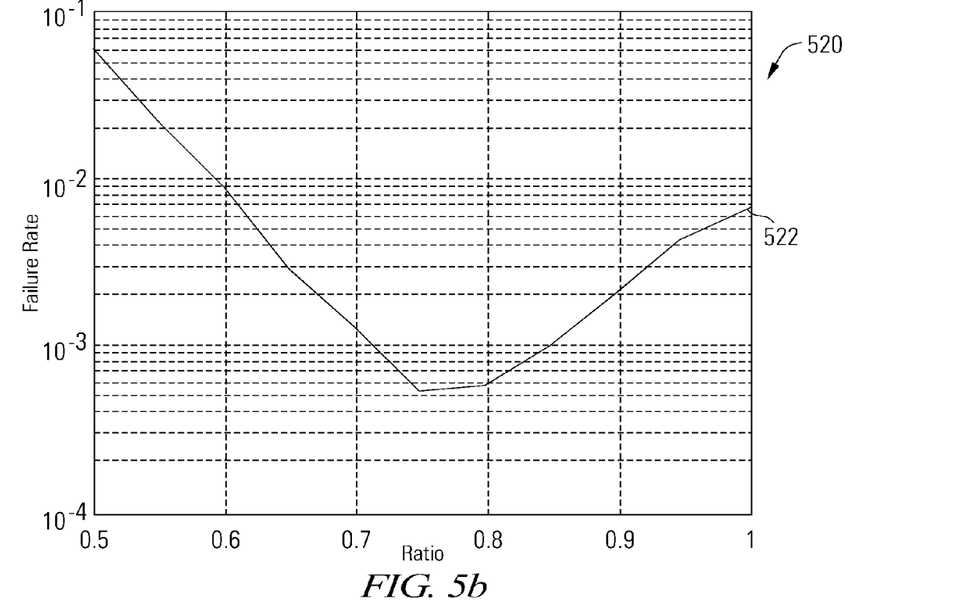
FIG. 5b graphically depicts failure rate as a function of the scaling ratio in a ratio-adjustable sync mark detector circuit in accordance with one or more embodiments of the present invention.

Turning to FIG. 5a, the early detection rate 502 and the misdetection rate 504 are plotted in graph 500 as a function of the adjustable ratio 304 in an embodiment of the sync mark found indication circuit 300 using a typical channel and noise model. As shown in FIG. 5a, the early detection rate 502 decreases and the misdetection rate 504 increases as the ratio 304 increases. The crossing point between the early detection rate 502 and the misdetection rate 504 is observed at about $\gamma=0.75$. The sync mark detection failure rate 522 can be defined as the sum of early detection rate 502 and misdetection rate 504, and is plotted in graph 520 of FIG. 5b, confirming that the lowest failure rate is achieved at about $\gamma=0.75$.

The value of the adjustable ratio 304 is determined in some embodiments in this manner, balancing the early detection rate and the misdetection rate for a particular data channel design and expected channel conditions such as the expected signal to noise ratio, the preamble pattern and sync mark pattern used, the read assembly performance, etc. The ratios 404, 442, 444 in the sync mark found indication circuit 400 can be balanced in a similar manner, identifying ratio values that provide low sync mark detection failure rates. Although the additional adjustability of multiple ratios 404, 442, 444 gives additional variables, each combination of ratio values will yield sync mark detection failure rates that can be compared to select the values that yield the desired performance and balance between early detection and misdetection.

Figure 6:
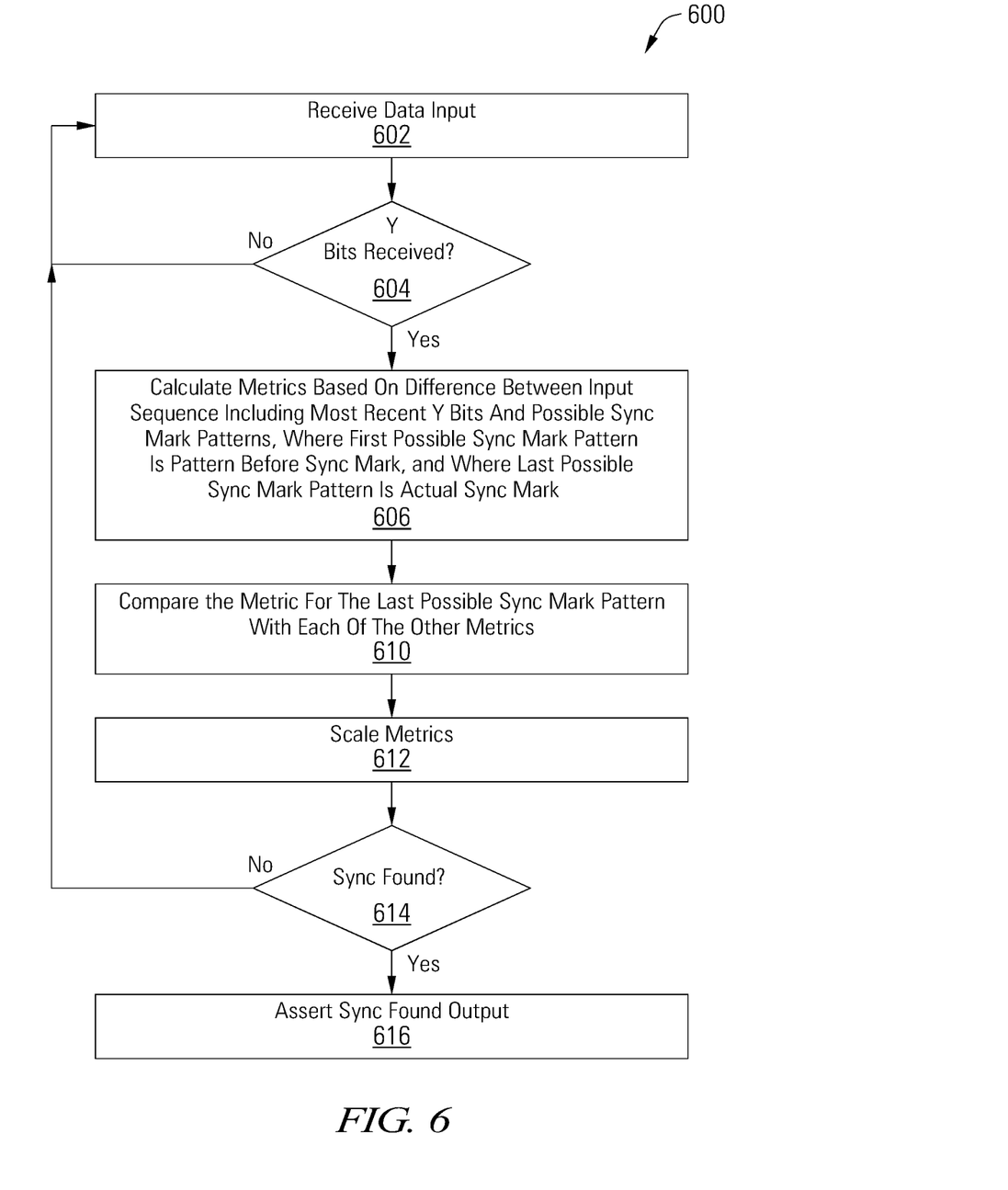
FIG. 6 is a flow diagram showing a method for ratio-adjustable sync mark detection in accordance with some embodiments of the present invention.

Turning to FIG. 6, flow diagram 600 shows a method in accordance with one or more embodiments of the present invention for identifying a sync mark. Following flow diagram 600, data samples are received as a data input (block 602). The received data samples may be derived from, for example, a storage medium or a wireless transfer medium, and retrieved from, for example, an analog to digital converter or digital finite impulse response filter. Based upon the disclosure provided herein, one of ordinary skill in the art will recognize a variety of sources of the data samples. It is determined whether Y samples have been received (block 604). In some embodiments of the present invention, Y is four bits. Based upon the disclosure provided herein, one of ordinary skill in the art will recognize other values for Y that may be used in relation to different embodiments of the present invention. Where Y samples have not yet been received (block 604), the process returns to await additional samples (block 602). In various embodiments, data can be received bit by bit or symbol by symbol. Where the possible sync mark patterns are defined by Y-bit blocks, input data is processed each time a new Y-bit block is received from the input. An input sequence to be examined for a sync mark is a data sequence of N*Y bits, bounded by the most recently received Y bits. Each time a new Y bit block is received and is shifted into the data sequence being processed, an oldest Y bit block is removed from or shifted out of the data sequence being processed.

Where Y samples have been received (block 604), the data sequence including the most recently received Y bits is compared with various patterns. In particular, the data sequence including the most recently received Y bits are compared with each of a number of possible sync mark patterns to yield metrics (block 606), where the first possible sync mark pattern is the pattern before the sync mark, and where the last possible sync mark pattern is the actual sync mark. Notably, the metrics are used to search for a particular sync mark pattern that is written to a storage medium or transmitted, as a sliding window is moved over the received data, for example over a repeating preamble and then the sync mark, different data patterns will be retrieved as shown in FIG. 2b. One such possible sync mark pattern corresponds with metric 4 232, including one portion of the preamble 281e and the first four portions of the sync mark pattern 282, 283, 284, 285. Another such possible sync mark pattern corresponds with metric 5 231, including the first five portions of the sync mark pattern 282, 283, 284, 285, 286. One manner to interpret the possible sync mark patterns is to view them as the contents of a sliding window as it moves across the received data stream, with the contents of the sliding window being a possible sync mark pattern as long as it includes at least some of a sync mark. The possible sync mark patterns are known in advance, as they are included in advance in the data to be stored or transmitted. For example, sync mark patterns may be written to a magnetic hard disk in advance to indicate the following locations to which user data can be written.

Metrics can be calculated based on absolute sum distance or Euclidean distance as disclosed above, or using any other suitable manner of measuring the difference between the possible sync mark patterns and the input data sequence. The metrics are scaled using one or more adjustable ratios (block 610). In some embodiments, all metrics are scaled except the last possible sync mark pattern that corresponds to the actual sync mark. In other embodiments, just the metric for the last possible sync mark pattern is scaled. In yet other embodiments, all metrics may be scaled with different metric values. The scaling factor or ratio to be applied to the metrics is a single value in some embodiments, and in other embodiments, includes customized values for some or all of the metrics.

The metric for the last possible sync mark pattern is compared with each of the other metrics (block 612). The sync mark is found when the metric for the last possible sync mark pattern is less than all the other metrics. In other words, the difference between the input data sequence and the sync mark is less than the distance between the input data sequence and all the other possible sync mark patterns. This indicates that the input data is more likely to correspond to the actual sync mark than to any of the other possible inputs that would be read in the positions leading up to the actual sync mark, as shown in FIG. 2b. Notably, other metrics may be used in which a higher metric value indicates that the sync mark has been found. If the determination is made that the sync mark has been found (block 614), the sync found output is asserted (block 616). Otherwise, the process continues (block 602) with the next input data.

Figure 7:
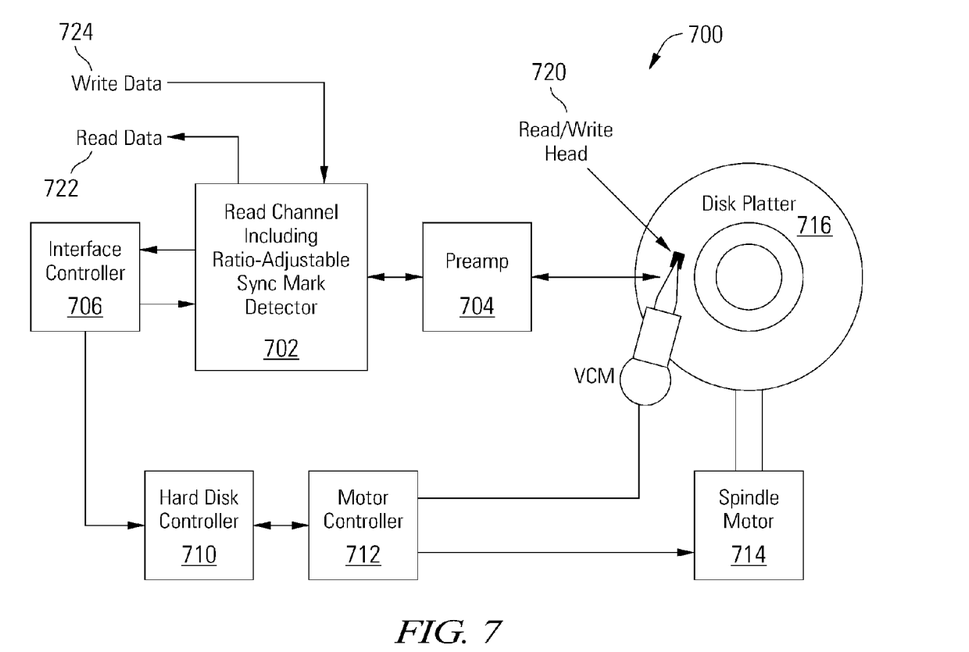
FIG. 7 depicts a storage system including a read channel with a ratio-adjustable sync mark detector in accordance with various embodiments of the present invention.

Turning to FIG. 7, a storage system 700 is illustrated as an example application of a data processing system with a ratio-adjustable sync mark detector in accordance with some embodiments of the present invention. The storage system 700 includes a read channel circuit 702 with a data processing system with a ratio-adjustable sync mark detector in accordance with some embodiments of the present inventions. Storage system 700 may be, for example, a hard disk drive. Storage system 700 also includes a preamplifier 704, an interface controller 706, a hard disk controller 710, a motor controller 712, a spindle motor 714, a disk platter 716, and a read/write head assembly 720. Interface controller 706 controls addressing and timing of data to/from disk platter 716.

The data on disk platter 716 consists of groups of magnetic signals that may be detected by read/write head assembly 720 when the assembly is properly positioned over disk platter 716. In one embodiment, disk platter 716 includes magnetic signals recorded in accordance with either a longitudinal or a perpendicular recording scheme.

In a typical read operation, read/write head assembly 720 is accurately positioned by motor controller 712 over a desired data track on disk platter 716. Motor controller 712 both positions read/write head assembly 720 in relation to disk platter 716 and drives spindle motor 714 by moving read/write head assembly 720 to the proper data track on disk platter 716 under the direction of hard disk controller 710. Spindle motor 714 spins disk platter 716 at a determined spin rate (RPMs). Once read/write head assembly 720 is positioned adjacent the proper data track, magnetic signals representing data on disk platter 716 are sensed by read/write head assembly 720 as disk platter 716 is rotated by spindle motor 714. The sensed magnetic signals are provided as a continuous, minute analog signal representative of the magnetic data on disk platter 716. This minute analog signal is transferred from read/write head assembly 720 to read channel circuit 702 via preamplifier 704. Preamplifier 704 is operable to amplify the minute analog signals accessed from disk platter 716. In turn, read channel circuit 702 decodes and digitizes the received analog signal to recreate the information originally written to disk platter 716. This data is provided as read data 722 to a receiving circuit. While processing the read data, read channel circuit 702 processes the received signal using a data processing system with a ratio-adjustable sync mark detector. Such a ratio-adjustable sync mark detector may be implemented consistent with that disclosed above in relation to FIGS. 2a-5b. In some cases, the data processing may be performed consistent with the flow diagram disclosed above in relation to FIG. 6. A write operation is substantially the opposite of the preceding read operation with write data 724 being provided to read channel circuit 702. This data is then encoded and written to disk platter 716.

It should be noted that storage system 700 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 700, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data processing system with a ratio-adjustable sync mark detector is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 700 may be modified to include solid state memory that is used to store data in addition to the storage offered by disk platter 716. This solid state memory may be used in parallel to disk platter 716 to provide additional storage. In such a case, the solid state memory receives and provides information directly to read channel circuit 702. Alternatively, the solid state memory may be used as a cache where it offers faster access time than that offered by disk platter 716. In such a case, the solid state memory may be disposed between interface controller 706 and read channel circuit 702 where it operates as a pass through to disk platter 716 when requested data is not available in the solid state memory or when the solid state memory does not have sufficient storage to hold a newly written data set. Based upon the disclosure provided herein, one of ordinary skill in the art will recognize a variety of storage systems including both disk platter 716 and a solid state memory.

Figure 8:
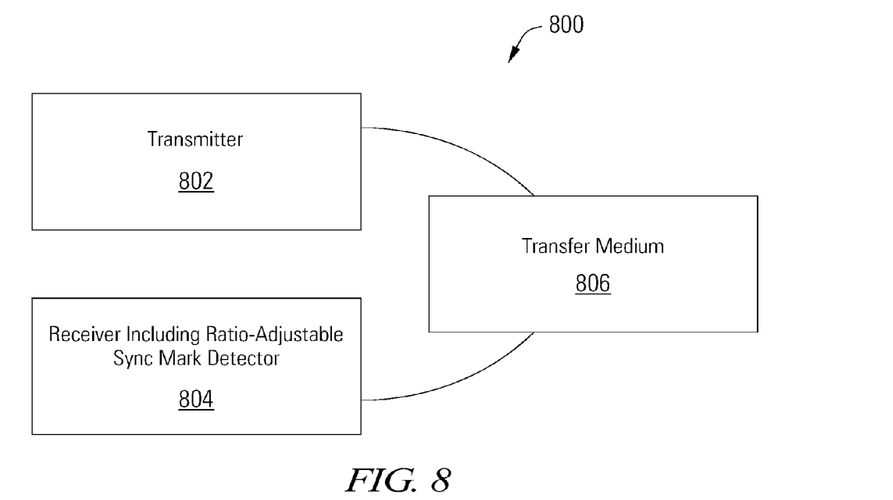
FIG. 8 depicts a wireless communication system including a ratio-adjustable sync mark detector in accordance with various embodiments of the present invention.

Turning to FIG. 8, a wireless communication system 800 or data transmission device including a receiver 804 with a ratio-adjustable sync mark detector is shown in accordance with some embodiments of the present inventions. Communication system 800 includes a transmitter 802 that is operable to transmit encoded information via a transfer medium 806 as is known in the art. The encoded data is received from transfer medium 806 by receiver 804. Receiver 804 incorporates a ratio-adjustable sync mark detector. Such a ratio-adjustable sync mark detector may be implemented consistent with that disclosed above in relation to FIGS. 2a-5b. In some cases, the data processing may be performed consistent with the flow diagram disclosed above in relation to FIG. 6.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel systems, devices, methods and arrangements for detecting a sync mark with a ratio-adjustable detection system. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing circuit comprising:
a pattern match calculation circuit operable to calculate a plurality of metrics representing a difference between a data sequence and each of a plurality of possible data patterns, wherein one of the plurality of possible data patterns comprises a target data pattern and a remainder of the plurality of possible data patterns each comprise a subset of the target data pattern, and wherein a primary metric from the plurality of metrics corresponds to the difference between the data sequence and the target data pattern; and
an indication circuit operable to compare the primary metric with each of the plurality of metrics other than the primary metric, wherein at least one of the plurality of metrics is scaled, and wherein the indication circuit is operable to assert a target data pattern found signal based at least in part on the comparisons.

2. The data processing circuit of claim 1, wherein the indication circuit comprises a plurality of multipliers operable to multiply each of the plurality of metrics other than the primary metric by a scaling factor.

3. The data processing circuit of claim 1, wherein the indication circuit comprises a plurality of multipliers operable to multiply each of the plurality of metrics other than the primary metric by a different scaling factor.

4. The data processing circuit of claim 3, wherein the indication circuit further comprises a plurality of comparators each operable to compare the primary metric with a different scaled metric from one of the plurality of multipliers.

5. The data processing circuit of claim 4, wherein the indication circuit further comprises a logic AND circuit operable to assert the target data pattern found signal when an output of each of the plurality of comparators is asserted.

6. The data processing circuit of claim 1, wherein the at least one of the plurality of metrics is scaled before the indication circuit compares them.

7. The data processing circuit of claim 1, wherein the target data pattern comprises a sync mark.

8. The data processing circuit of claim 1, wherein the indication circuit is operable to assert the target data pattern when the primary metric is smaller than each of the plurality of metrics other than the primary metric.

9. The data processing circuit of claim 1, wherein a scaling factor by which the at least one of the plurality of metrics is scaled is operable to reduce a target pattern detection error rate, where the target pattern detection error rate comprises a sum of an early detection rate and a misdetection rate.

10. The data processing circuit of claim 1, wherein the circuit is implemented as an integrated circuit.

11. The data processing circuit of claim 1, wherein the data processing circuit is implemented as part of a device selected from a group consisting of: a data storage device and a wireless communication device.

12. The data processing circuit of claim 1, wherein the pattern match calculation circuit is operable to calculate the plurality of metrics by calculating an absolute sum distance between the data sequence and each of the plurality of possible data patterns.

13. The data processing circuit of claim 1, wherein the pattern match calculation circuit is operable to calculate the plurality of metrics by calculating a Euclidean distance between the data sequence and each of the plurality of possible data patterns.

14. A method for detecting a target data pattern, comprising:
receiving an input data sequence;
calculating a first metric representing a difference between the input data sequence and a target data pattern;
calculating at least one second metric representing a difference between the input data sequence and a second data sequence including a subset of the target data pattern;
scaling at least one of the first metric and the at least one second metric by a scaling factor;
comparing the first metric and the at least one second metric; and
indicating that the target data pattern has been detected in the input data sequence based at least in part on the comparing.

15. The method of claim 14, further comprising selecting the scaling factor to reduce a target data pattern detection error rate, where the target data pattern detection error rate comprises a sum of an early detection rate and a misdetection rate.

16. The method of claim 14, wherein indicating that the target data pattern has been detected in the input data sequence based at least in part on the comparing comprises indicating that the target data pattern has been detected in the input data sequence when the first metric is lower than the at least one second metric.

17. The method of claim 14, wherein the scaling comprises multiplying the at least one second metric by the scaling factor before the comparing.

18. The method of claim 14, wherein calculating the first metric and the at least one second metric comprises calculating absolute sum distances between the input data sequence and each of the first metric and the at least one second metric.

19. A storage device, comprising:
a storage medium;
a head assembly disposed in relation to the storage medium and operable to provide a sensed signal corresponding to a data set on the storage medium; and
a read channel circuit including a sync mark detector, comprising:
a pattern match calculation circuit operable to calculate a plurality of metrics representing a difference between a data sequence derived from the sensed signal and each of a plurality of possible data patterns, wherein one of the plurality of possible data patterns comprises a target data pattern and a remainder of the plurality of possible data patterns each comprise a subset of the target data pattern, and wherein a primary metric from the plurality of metrics corresponds to the difference between the data sequence and the target data pattern; and
an indication circuit operable to compare the primary metric with each of the plurality of metrics other than the primary metric, wherein at least one of the plurality of metrics is scaled, and wherein the indication circuit is operable to assert a target data pattern found signal based at least in part on the comparisons.

20. The storage device of claim 19, wherein a scaling factor by which the at least one of the plurality of metrics is scaled is operable to reduce a target pattern detection error rate, where the target pattern detection error rate comprises a sum of an early detection rate and a misdetection rate.

* * * * *